Sheet 1, 4 Sheets.

G. H. Corliss.
Steam Engine.

No. 200. Reissued May 13, 1851.

N. PETERS, PHOTO-LITHOGRAPHER, WASHINGTON, D. C.

Sheet 2, 4 Sheets.

G. H. Corliss.
Steam Engine.

No. 200. Reissued May 13, 1851.

N. PETERS, PHOT.-LITHOGRAPHER, WASHINGTON, D. C.

Sheet 3, 4 Sheets.
G. H. Corliss.
Steam Engine.
No. 200. Reissued May 13, 1851.
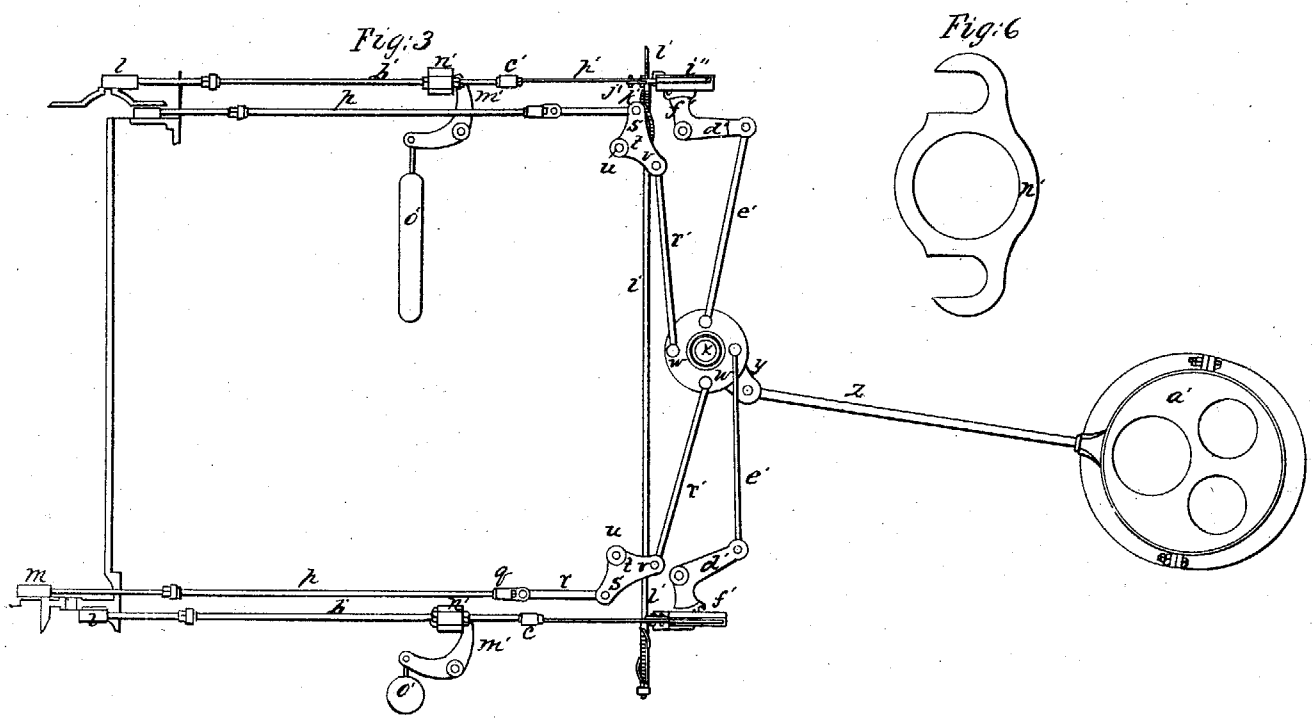
N. PETERS, PHOTO-LITHOGRAPHER, WASHINGTON, D. C.

Sheet 4, 4 Sheets.
G. H. Corliss.
Steam Engine.
No. 200. Reissued May 13, 1851.
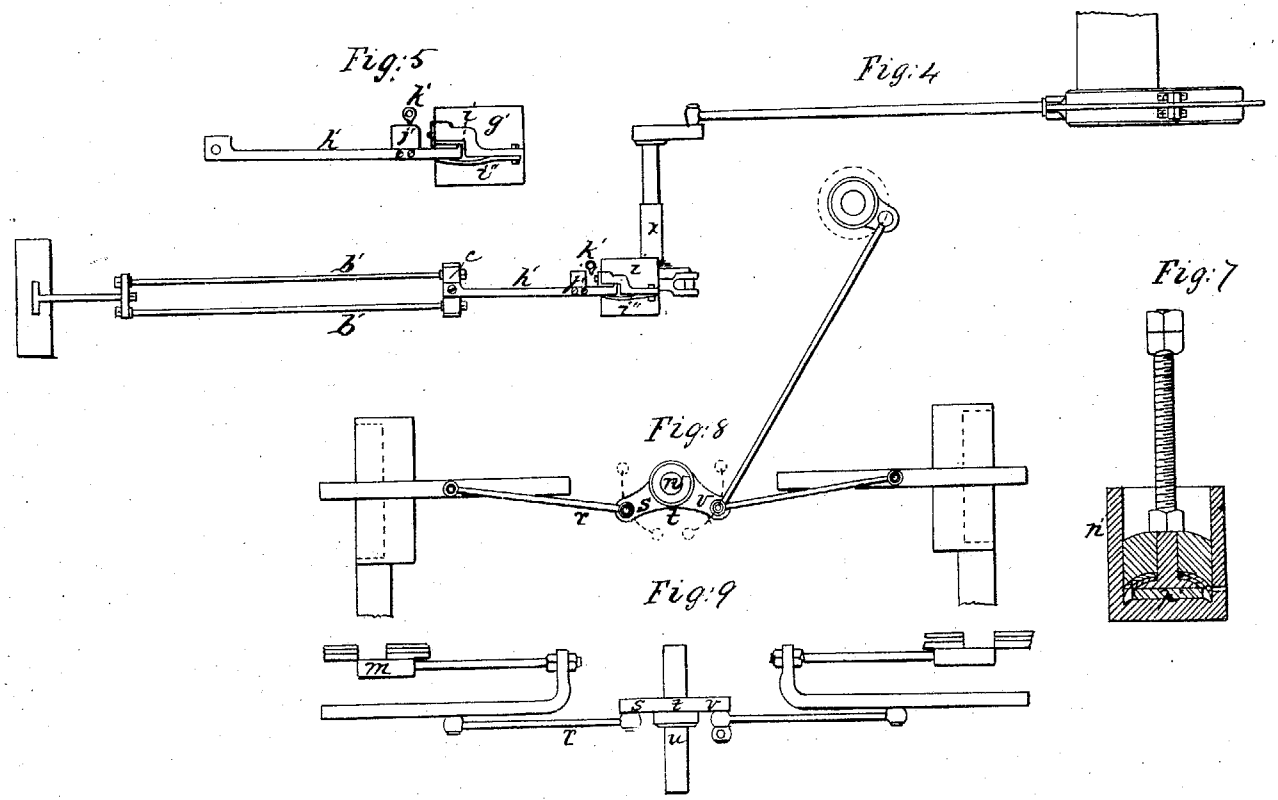
N. PETERS, PHOTO-LITHOGRAPHER, WASHINGTON, D. C.

UNITED STATES PATENT OFFICE.

GEORGE H. CORLISS, OF PROVIDENCE, RHODE ISLAND.

IMPROVEMENT IN CUT-OFF AND WORKING THE VALVES OF STEAM ENGINES.

Specification forming part of Letters Patent No. 6,162 dated March 10, 1849; Reissue No. 200, dated May 13, 1851.

*To all whom it may concern:*

Be it known that I, GEORGE H. CORLISS, of the city and county of Providence, and State of Rhode Island, have invented certain new and useful Improvements in Steam-Engines; and I do hereby declare that the following is a full, clear, and exact description of the principle or character which distinguishes them from all other things before known, and of the manner of making, constructing, and using the same, reference being had to the accompanying drawings, making a part of this specification, in which—

Figure 1:
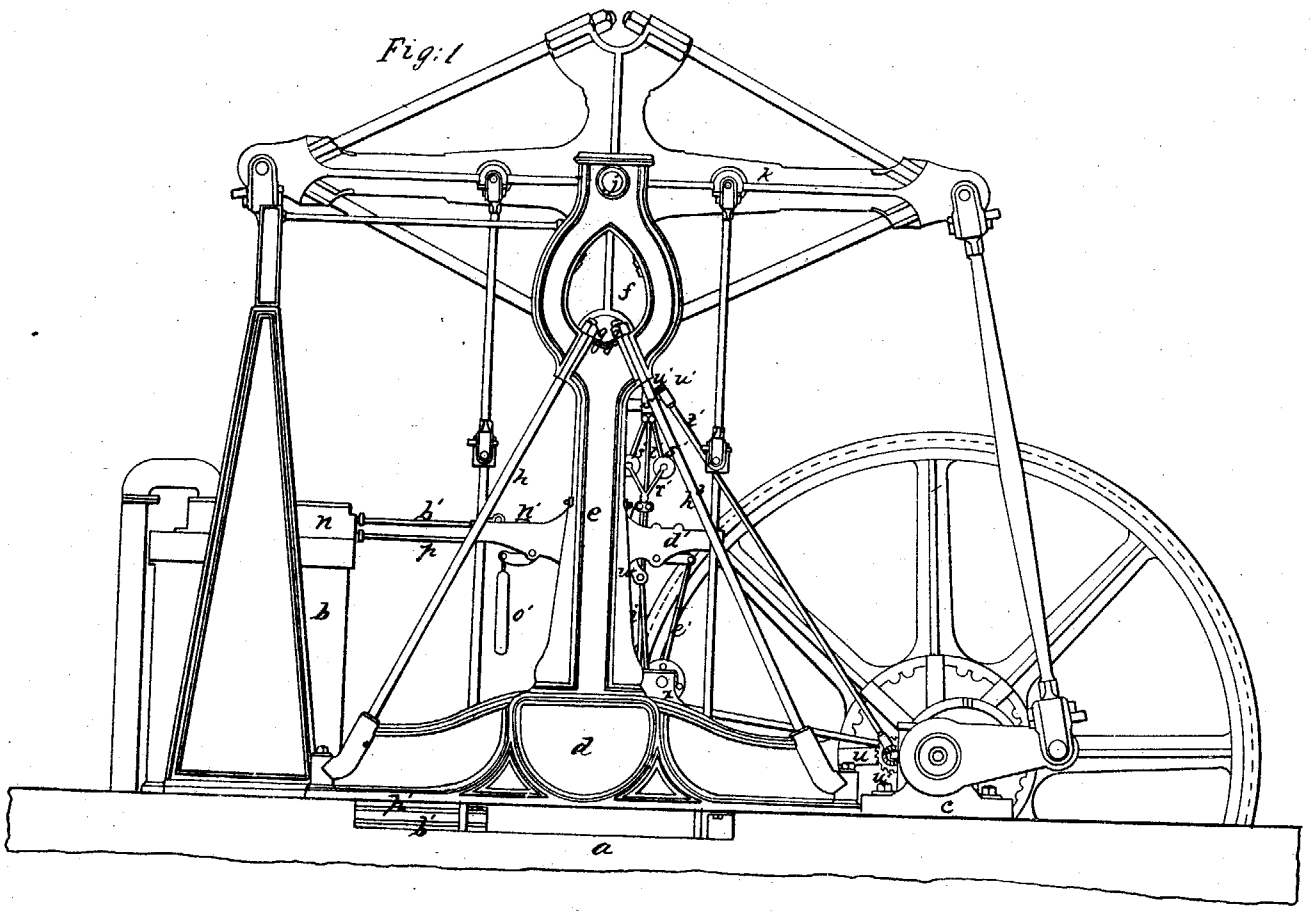
Figure 2:
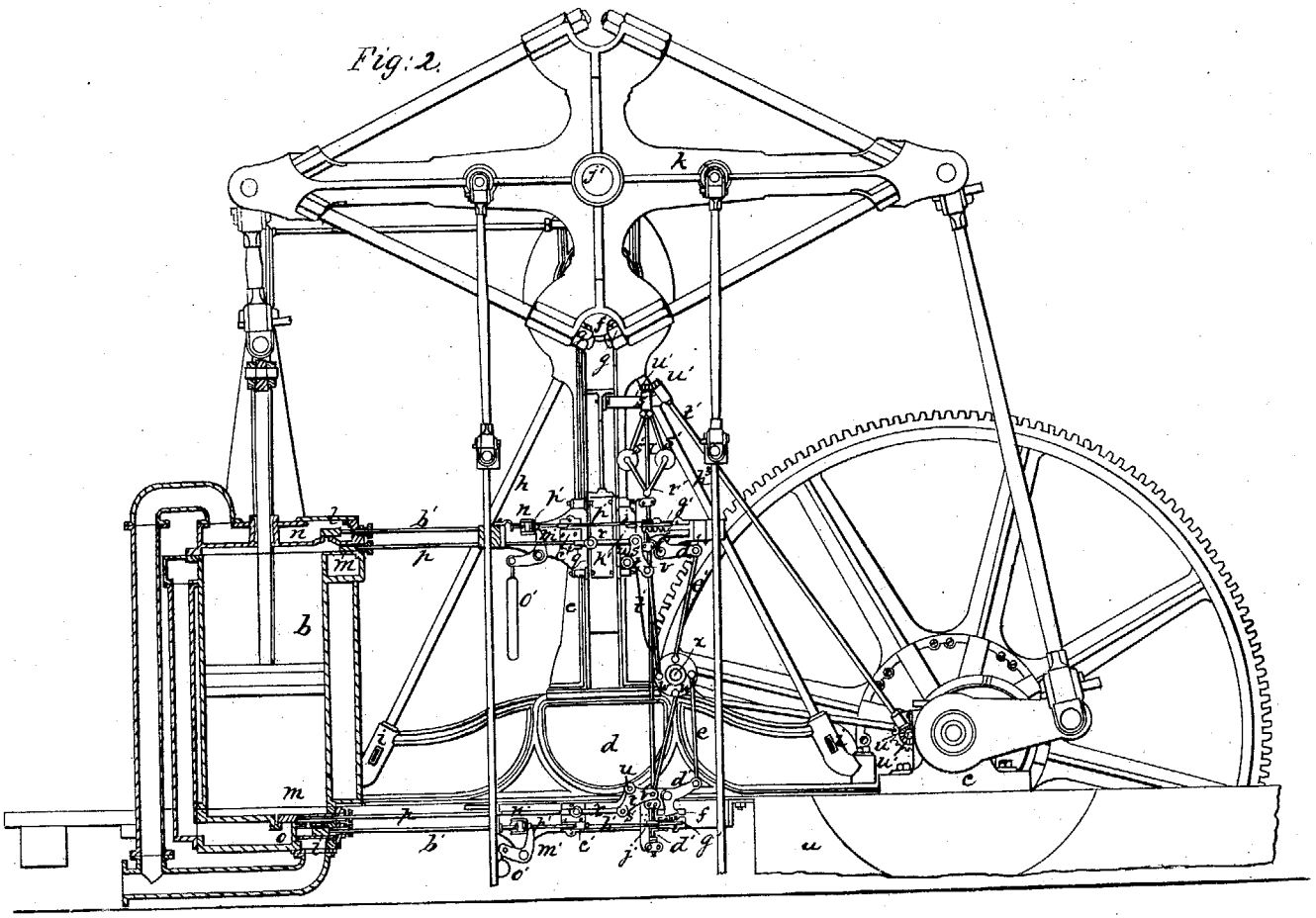

Figure 1 is a side elevation of an engine on my improved plan; Fig. 2, a longitudinal vertical section; Fig. 3, an elevation of the valves and the arrangement of parts working them; Fig. 4, a plan thereof; Fig. 5, a separate section representing a latch used in the valve-gear; Figs. 6 and 7, a plan and section of an air-cylinder and piston for checking the motion of the valve apparatus.

The same letters indicate like parts in all the figures.

In that class of steam-engines in which the steam and exhaust ports of the cylinder are opened and closed by slide-valves, whenever the valves close the ports the steam presses them upon their seats with its whole force, and they cannot then be moved without the expenditure of a considerable amount of power, but when the valves do not completely close their ports the steam pressing upon both sides of them does not tend to hold them upon their seats, and at these times the valves can be moved with but a small exertion of force. When a valve has closed its port its office is performed, and hence the force exerted in any further movement of it while the port remains closed is wholly lost. Now, it is customary in this class of engines to connect the valves rigidly, so that when one is moved the other is forced to move with it to the same extent. The closed valve is therefore moved with the opening one, and consequently the whole amount of force consumed in moving it while closed is expended to no good purpose, and tends only to increase the wear and tear of the engine. To avoid this sacrifice of power and at the same time to retain the advantages which result from the connection of the valves is the object of the first part of my invention, which consists in moving each of the steam and exhaust valves of an engine independently by means of one crank-wrist of a series, which are all attached to a common disk, wrist-plate, or other equivalent device, which is secured to and moved with a rock-shaft. The several wrists which work the different valves are arranged upon the wrist-plate in such positions, with respect to the rods and levers or other devices which connect them with the valves, that they shall act like so many cranks, each of which vibrates near its dead-point or point of slowest throw, and therefore imparts but little movement to the valve it actuates when the latter is closed, while each moves with its fastest throw and therefore communicates the greatest movement to its valve when the latter is open. Two great advantages result from this method of working the valves: In the first place, much of the power heretofore expended in moving the closed valve is saved; and, secondly, the wire-drawing of the steam is reduced, because the valves while opening and closing the ports are moved with increased speed.

The second part of my invention relates to the method of regulating the cut-off of the steam in its passage into the engine, and it consists in effecting this by means of the governor, which operates cams so that when the velocity of the engine is too great these cams shall be moved by the action of the regulator to such positions that catches on the valve-rods may the sooner come in contact with them to liberate the valves and admit of their being closed by the force of weights or springs, and thus cut off the steam in proportion to the velocity of the engine, this being done sooner when the velocity of the engine is to be reduced, and later when it is to be increased.

In the steam-engine represented in the accompanying drawings the steam and exhaust valves *l l* and *m m* are situated in steam-chests *n o* at each extremity of the steam-cylinder. The chest *n* at the top is formed in the cylinder-head while the other, *o*, is let into a recess in the bed-plate. Each exhaust-valve *m* is attached to one extremity of a valve-rod, *p*, which is fitted at its opposite extremity with a sliding head, *q*, that is linked, by a connecting-rod, *r*, to one arm, *s*, of a bell-crank, *t*. The other arm, *v*, of the bell-crank is connected by a rod with a wrist-pin, *w*, on the wrist-plate *x*. The latter is secured to a rock-shaft, to which the requisite vibratory motion is imparted by an eccentric, *a'*, through the intervention of an eccentric-rod and an arm, *y*, secured to the rock-shaft. The wrists *w* of the two valves are in this example a quarter of a circle distant from each other, and the two connecting-rods extend in opposite directions from the rock-shaft. Hence, when one wrist is at its point of greatest throw, the other is at its dead-point, and when one is imparting to its rod and the valve connected therewith the greatest movement, the other is imparting to its valve the least. Each valve is therefore moved alternately fast and slow, and the fast movement of one is effected during the slow movement of the other, nearly the whole movement or throw of each valve being effected while the port is either partially or wholly open, at which time the least power is required to move it; while as the small remnant of the throw when the port is closed is effected during the slow movement, but little power is then required, as the distance to which the valve is moved is now very short.

The steam-valves *l l* are worked in a manner similar to that of the exhaust-valves, with the exception of an arrangement by means of which they are made to close and cut off the supply of steam at any required portion of the stroke. The valve-rods *b'* of these valves are double, and, instead of being permanently linked to their appropriate bell-cranks, are each connected by a detachable link, *h'*, with a rack, *g'*, whose teeth engage with those of a toothed sector, *f'*, on the bell-crank. This detachable link *h* is hinged at one extremity to the cross-head *c'*, which unites the two members of the double-valve rod. It has a shoulder, *i'*, at its opposite extremity, which engages in a corresponding socket on the rack, and is kept in place by a spring, *i''*. This link *h'* is also fitted near the rack with a projection, *j'*, which is struck at the proper moment to detach the link from the rack by a revolving helical cam, *k'*. The helical cams which detach the links *h' h'* of the two steam-valves *l l* are both secured to an upright shaft, *l'*, which is caused to revolve by the movement of the crank-shaft, and is arranged at the same time to move freely up or down in its boxes. This shaft is connected at *r'* with the governor, which, in the present instance, is of the centrifugal variety, that being the kind I have used, deeming it the best, so that it shall move up or down as the balls of the governor rise and fall. When the governor-balls *s' s'* are at their lowest position, the shaft *l'* is depressed so far that the helical cams *k' k'* are below the range of the valve-links *h' h'*, and, consequently, cannot detach them; hence, in this position of the governor-balls, the steam-valves, being connected with their wrist-pins throughout the whole length of the stroke, are opened and closed in the same manner as the exhaust-valves. As, however, the velocity of the engine is increased and the governor-balls rise under the increased centrifugal force, the upright shaft *l'* is correspondingly raised and the cams, being now revolved within the range of the valve-links, strike the projections *j'* and detach the links *h'* from their racks. The helical cams extend around the shaft in the same direction as the latter is turned; consequently, the higher the shaft *l'* and its cams are raised the sooner will the cams strike the projections and detach the links. As soon as the links are detached, the valves, being entirely disconnected from the mechanism by means of which they are opened, are, consequently, free to close. As the steam-valves in the steam-engine represented move horizontally, they do not tend to close by their own weight, and are, consequently, closed by means of weights *o o'*, which act through the intervention of bent levers or bell-cranks *m'* upon cross-blocks *n'*, secured to the respective valve-rods.

In order to prevent the jar which would result from the sudden stoppage of the motion of the weight, each cross-block *n'* has a cylindrical socket formed in the face nearer the steam-cylinder, and a piston, *p'*, is secured to the engine-frame, which enters the cylindrical socket and compresses the air within it to form an elastic cushion to prevent the jar. As the racks *g'* are moved back by the action of the wrist-pins and the bell-cranks, the shoulder of the link re-engages with the socket on the rack, so that the valve, being now reconnected with the valve mechanism, is opened by the wrist-pin at the proper moment to admit steam into the cylinder. When the steam-valves are not used as variable cut-off valves, they are to be operated in every particular like the exhaust-valves. It is obvious from the foregoing description that when the valves are so arranged that they move parallel with the axis of the cylinder, as is the customary arrangement in slide-valve engines, the rock-shaft by which they are operated may with advantage be located in a position different from that described above, and the valve-connections must be adapted to this change.

A convenient mode of arranging the several parts when the valves move parallel with the axis of the cylinder is represented at Figs. 8 and 9, in which the letters indicate the parts corresponding with those indicated by them in the arrangement before described.

I wish it to be distinctly understood that in the mode of regulating the cut-off by the governor I do not limit myself to the use of the particular kind of cams described or represented, as the form, position, and operation of these may be greatly varied without changing the principle of this part of my invention—as, for instance, stops or cams connected with the slide of the governor by levers may be made to slide in the direction of the plane of motion of the valve-rods to vary the periods of liberating the catches of the valve-rods, or wedge-formed stops or cams may be substituted for the helical cams and attached to the cam-rod, which in that case must not turn.

The mode of applying the principle which I have first described is the one which I have essayed with success, and therefore I have described it minutely, but the two modifications indicated will show clearly that the same principle is susceptible of various modifications.

What I claim as my invention, and desire to secure by Letters Patent, is—

1. The method, substantially as described, of operating the slide-valves of steam-engines by connecting the valves that govern the ports at opposite ends of the cylinder with separate arms of the rock-shaft, or the mechanical equivalents thereof, so that from the motion thereof the valve that keeps its port or ports closed shall move over a less space while its port or ports are closed than the one that is opening or closing its port or ports, and vice versa, while at the same time the two arms by which they are operated have the same range of motion, as described, whereby I am enabled to save much of the power heretofore required to work the slide-valves of steam-engines, and by which, also, I am enabled to give a greater range of motion to the valves at the periods of opening and closing the ports, to facilitate the induction and eduction of steam, as specified.

2. The method of regulating the motion of steam-engines by means of the regulator, by combining the said regulator with the catches that liberate the steam-valves by means of movable cams or stops, substantially as described.

GEORGE H. CORLISS.

In presence of—

JOHN H. CLARK,

E. J. NIGHTINGALE.